(12) United States Patent
Nagai et al.

(10) Patent No.: US 7,537,252 B2
(45) Date of Patent: May 26, 2009

(54) VEHICLE BUMPER STRUCTURE

(75) Inventors: Shigeyuki Nagai, Saitama (JP); Shigekazu Koga, Saitama (JP); Keiichi Honda, Saitama (JP); Kazuyuki Fukagawa, Tokyo (JP); Daisaku Nakazato, Tokyo (JP); Sakae Sato, Toyama (JP)

(73) Assignees: Honda Motor Co., Ltd., Tokyo (JP); YKK AP Inc., Tokyo (JP); YKK Corporation, Tokyo (JP)

( * ) Notice: Subject to any disclaimer, the term of this patent is extended or adjusted under 35 U.S.C. 154(b) by 102 days.

(21) Appl. No.: 11/789,058

(22) Filed: Apr. 23, 2007

(65) Prior Publication Data

US 2007/0246956 A1    Oct. 25, 2007

(30) Foreign Application Priority Data

Apr. 24, 2006   (JP) ............................ P2006-119877

(51) Int. Cl.
*B60R 19/18*   (2006.01)
*B60R 19/04*   (2006.01)

(52) U.S. Cl. ...................................... 293/102; 293/142
(58) Field of Classification Search ................ 293/102, 293/108, 114, 121, 132, 133, 142
See application file for complete search history.

(56) References Cited

U.S. PATENT DOCUMENTS

| | | | | |
|---|---|---|---|---|
| 4,998,761 | A * | 3/1991 | Bayer et al. ................. | 293/121 |
| 5,154,462 | A * | 10/1992 | Carpenter ................... | 293/120 |
| 5,219,197 | A * | 6/1993 | Rich et al. ................... | 293/120 |
| 5,340,178 | A * | 8/1994 | Stewart et al. ............... | 293/122 |
| 5,407,239 | A * | 4/1995 | Arai et al. ................... | 293/146 |
| 5,727,826 | A * | 3/1998 | Frank et al. ................. | 293/102 |
| 6,000,738 | A * | 12/1999 | Stewart et al. ............... | 293/102 |
| 6,318,775 | B1 * | 11/2001 | Heatherington et al. ..... | 293/120 |
| 6,467,831 | B1 * | 10/2002 | Mori et al. .................. | 296/102 |
| 6,481,690 | B2 * | 11/2002 | Kariatsumari et al. ....... | 293/155 |
| 6,485,072 | B1 * | 11/2002 | Werner et al. ............... | 293/132 |
| 6,502,874 | B2 * | 1/2003 | Kajiwara et al. ............ | 293/133 |
| 6,698,808 | B2 * | 3/2004 | Burkhardt et al. ........... | 293/102 |

(Continued)

FOREIGN PATENT DOCUMENTS

EP    256174  A1 *  2/1988

(Continued)

*Primary Examiner*—Glenn Dayoan
*Assistant Examiner*—Paul A Chenevert
(74) *Attorney, Agent, or Firm*—Carrier, Blackman & Associates, P.C.; Joseph P. Carrier; William D. Blackman

(57) ABSTRACT

Bumper beam of a closed sectional shape includes: a vehicle-body-side inner wall portion to be mounted on a vehicle body; upper and lower outwardly-extending wall portions that extend from the upper and lower ends of the inner wall portion toward the outside of the vehicle body; an outer wall portion connecting the outwardly-extending wall portions; and at least one horizontal inner rib connecting the outer wall portion and the inner wall portion, the outer wall portion having a vertical wall portion extending vertically downward from the outer end of the upper outwardly-extending wall portion and a slanted wall portion slanted from the lower end of the vertical wall portion toward the vehicle body. Gusset of a closed sectional shape includes a horizontal rib for dispersing an impact force at least to the slanted wall portion.

11 Claims, 6 Drawing Sheets

U.S. PATENT DOCUMENTS

| | | | |
|---|---|---|---|
| 6,709,044 B2 * | 3/2004 | Frank | 293/102 |
| 6,908,130 B2 * | 6/2005 | Reutlinger et al. | 293/155 |
| 6,913,300 B2 * | 7/2005 | Mori et al. | 293/120 |
| 6,948,749 B2 * | 9/2005 | Graber | 293/102 |
| 7,017,960 B2 * | 3/2006 | Reierson et al. | 293/102 |
| 7,073,831 B2 * | 7/2006 | Evans | 293/155 |
| 7,086,690 B2 * | 8/2006 | Shuler et al. | 296/187.03 |
| 7,100,952 B2 * | 9/2006 | Reierson et al. | 293/102 |
| 7,201,412 B2 * | 4/2007 | Kashiwagi et al. | 293/109 |
| 7,201,414 B2 * | 4/2007 | Iketo et al. | 293/133 |
| 7,210,719 B2 * | 5/2007 | Honda et al. | 293/155 |
| 7,234,741 B1 * | 6/2007 | Reynolds et al. | 293/117 |
| 7,338,099 B2 * | 3/2008 | Okabe et al. | 293/102 |
| 2003/0227182 A1 * | 12/2003 | Yoshida et al. | 293/102 |
| 2004/0178645 A1 * | 9/2004 | Minami et al. | 293/121 |
| 2005/0089674 A1 * | 4/2005 | Zander et al. | 428/158 |
| 2007/0040398 A1 * | 2/2007 | Lutke-Bexten et al. | 293/102 |
| 2007/0228747 A1 * | 10/2007 | Hodoya et al. | 293/102 |

FOREIGN PATENT DOCUMENTS

| | | | |
|---|---|---|---|
| JP | 52037338 A | * | 3/1977 |
| JP | 59008552 A | * | 1/1984 |
| JP | 59048250 A | * | 3/1984 |
| JP | 06-286536 | | 10/1994 |

* cited by examiner

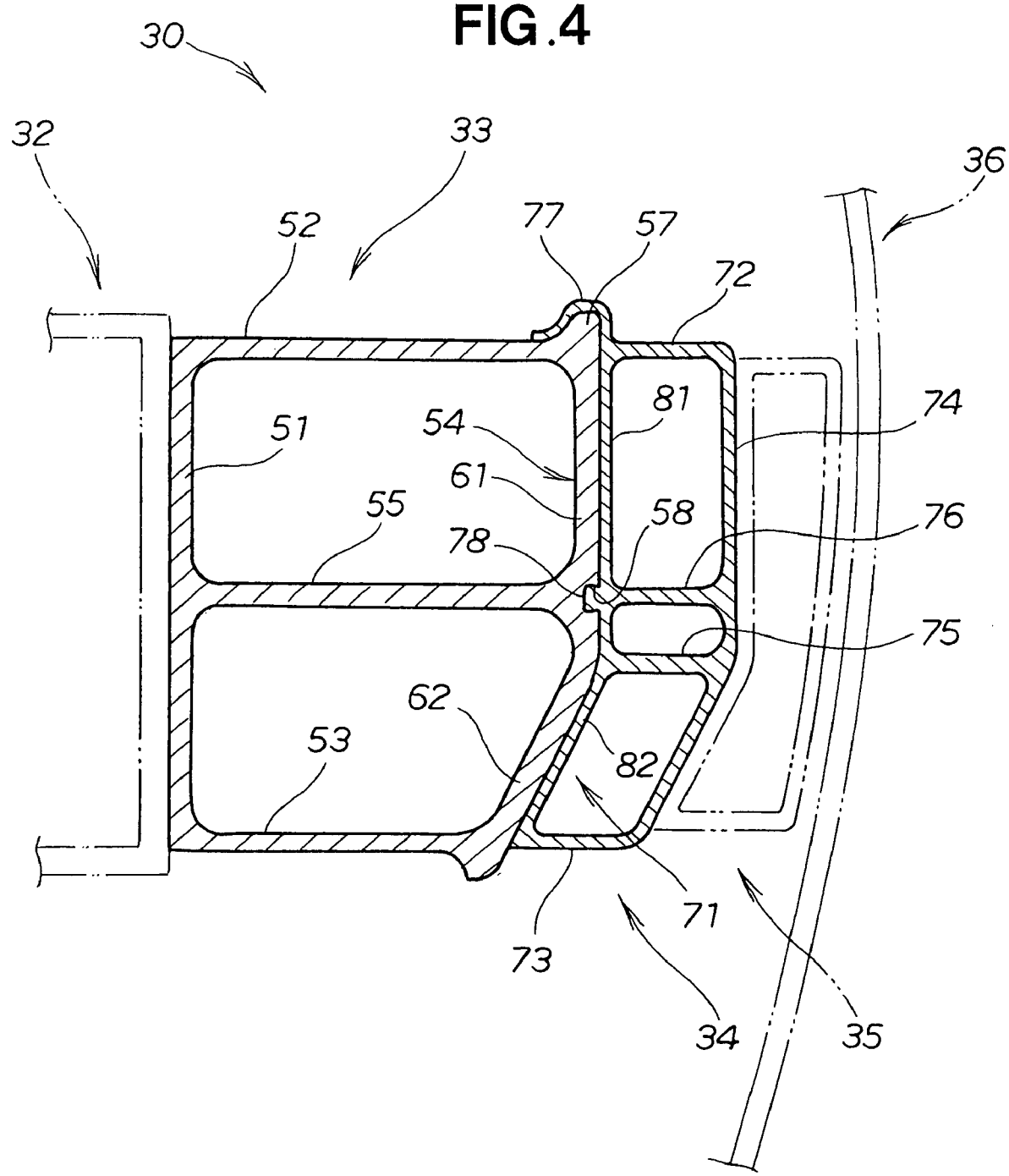

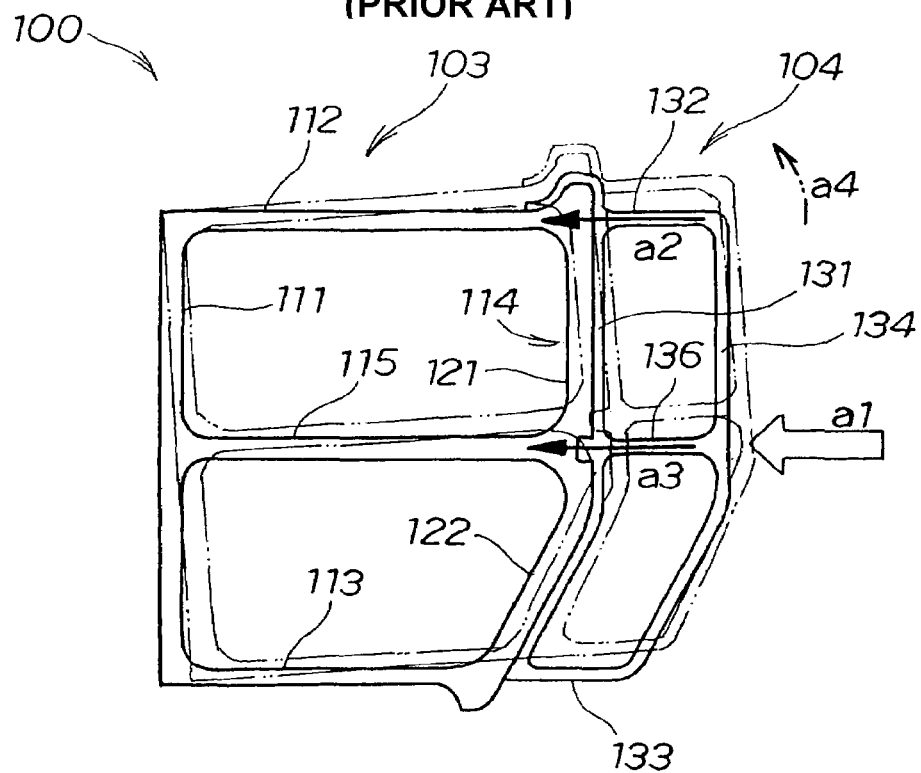
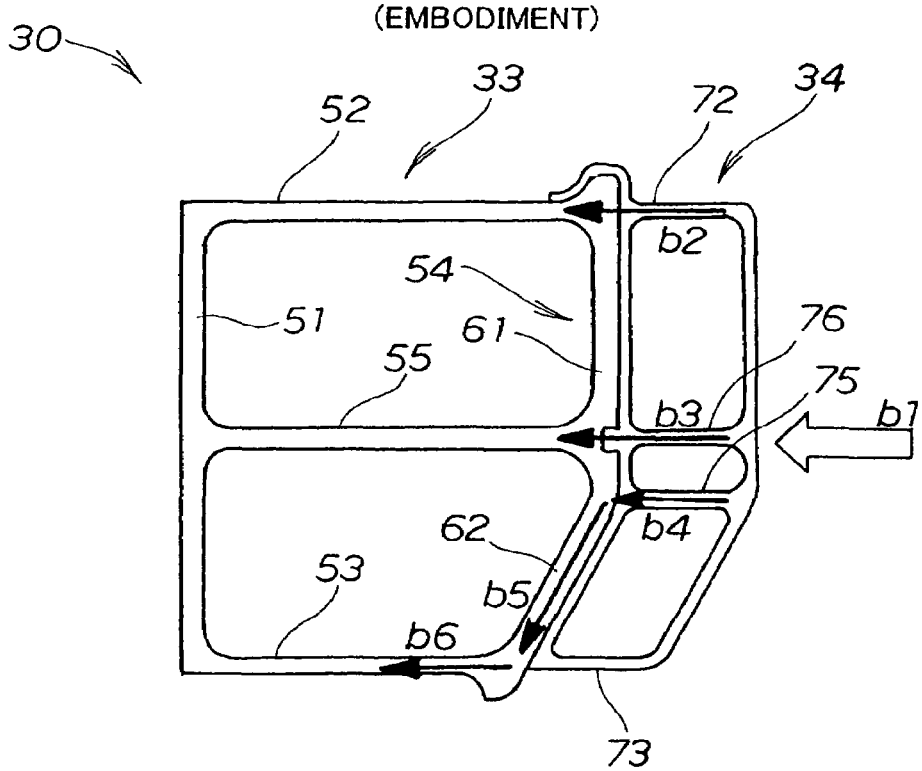

VEHICLE BUMPER STRUCTURE

FIELD OF THE INVENTION

The present invention relates to an improvement over vehicle bumper structures for absorbing an impact applied to a vehicle body.

BACKGROUND OF THE INVENTION

Among the various conventionally-known vehicle bumper structures, bumper structures are in actual use today which include a bumper beam mounted on a vehicle body via extensions and having an impact-absorbing gusset provided on its outer surface. With the currently-used vehicle bumper structures, it has been sufficient, from a practical viewpoint, to adjust, as necessary, rigidity of the bumper beam and impact-absorbing capability of the gusset. Japanese Patent Laid-Open Publication No. HEI-06-286536 discloses an example of such a vehicle bumper structure where the gusset is formed of an aluminum or aluminum alloy.

FIG. 6 hereof is a perspective view explanatory of a fundamental construction of the vehicle bumper structure 200 disclosed in the No. HEI-6-286536 publication, which generally comprises a bumper beam 201 formed as a hollow member and a gusset 203 adhered to an outer surface 202 of the bumper beam 201. The gusset 203 is a hollow extruded member formed of an aluminum or aluminum alloy and has inner vertical ribs 204 formed integrally with the inner surface of the gusset body.

However, if a distance between a bumper face (not shown) and the bumper beam 201 is very small and/or if the outer surface 202 of the bumper beam 201 is partly slanted for a design- or appearance-related reason, then the gusset 203 can not appropriately direct applied impact energy to the slanted surface. Further, when adhering the gusset 203 to the bumper beam 201, the adhering operation has to be performed with the outer surface of the gusset 203 oriented upwardly. Or, if the adhering operation is performed with the bumper beam 201 already mounted on the vehicle body, there arises a need to keep the gusset 203 fixed relative to the bumper beam 201 by means of a jig or the like until the adhesive agent is sufficiently cured.

SUMMARY OF THE INVENTION

In view of the foregoing prior art problems, it is an object of the present invention to provide an improved vehicle bumper structure which allows a gusset to be readily adhered to a bumper beam even with the bumper beam mounted on a vehicle body, and which can appropriately direct impact energy, applied to the gusset, to the bumper beam even where the beam has a slanted outer surface.

In order to accomplish the above-mentioned object, the present invention provides an improved vehicle bumper structure, which comprises a bumper beam to be mounted on a vehicle body and a gusset to be attached to the outer surface of the bumper beam for absorbing an impact force. In the present invention, the bumper beam is a beam of a closed sectional shape which includes: a vehicle-body-side inner wall portion to be mounted on the vehicle body; upper and lower outwardly-extending wall portions that extend from the upper and lower ends, respectively, of the vehicle-body-side inner wall portion toward the outside of the vehicle body; an outer wall portion connecting the upper and lower outwardly-extending wall portions; and at least one horizontal inner rib connecting the outer wall portion and the vehicle-body-side inner wall portion, the outer wall portion having a vertical wall portion extending vertically downward from the outer end of the upper outwardly-extending wall portion and a slanted wall portion slanted from a lower end of the vertical wall portion toward the vehicle body. The gusset has a closed sectional shape and includes a horizontal rib for dispersing an impact force at least to the slanted wall portion.

Such arrangements of the present invention can effectively restrain a force pushing the bumper beam upwardly, with the result that impact energy applied to the gusset can be appropriately directed to and received by the slanted wall portion of the bumper beam.

In an embodiment, the bumper beam has an upward projection formed on an upper end portion thereof, and the gusset has an engagement portion engageable with the projection of the bumper beam. Thus, when attaching the gusset to the bumper beam, the gusset can be reliably retained on the bumper beam until an adhesive agent is sufficiently cured, as a result of which the gusset can be appropriately attached to the bumper beam with enhanced workability Further, in an embodiment, a concave-convex fitting structure is provided on an outer surface portion of the bumper beam and a surface portion of the gusset facing the bumper beam. The vehicle bumper structure of the invention can prevent the gusset from accidentally falling off the bumper beam, e.g. during a transfer step, after the gusset is provisionally attached to the bumper beam.

BRIEF DESCRIPTION OF THE DRAWINGS

Certain preferred embodiments of the present invention will hereinafter be described in detail, by way of example only, with reference to the accompanying drawings, in which:

FIG. 4 is an enlarged sectional side view showing principal elements of the vehicle bumper structure of the present invention;

FIG. 5A is a view showing a conventionally-known vehicle bumper structure and

FIG. 5B is a view showing the vehicle bumper structure according to the embodiment of the present invention ("Embodiment")

DETAILED DESCRIPTION OF THE PREFERRED EMBODIMENTS

Figure 1:
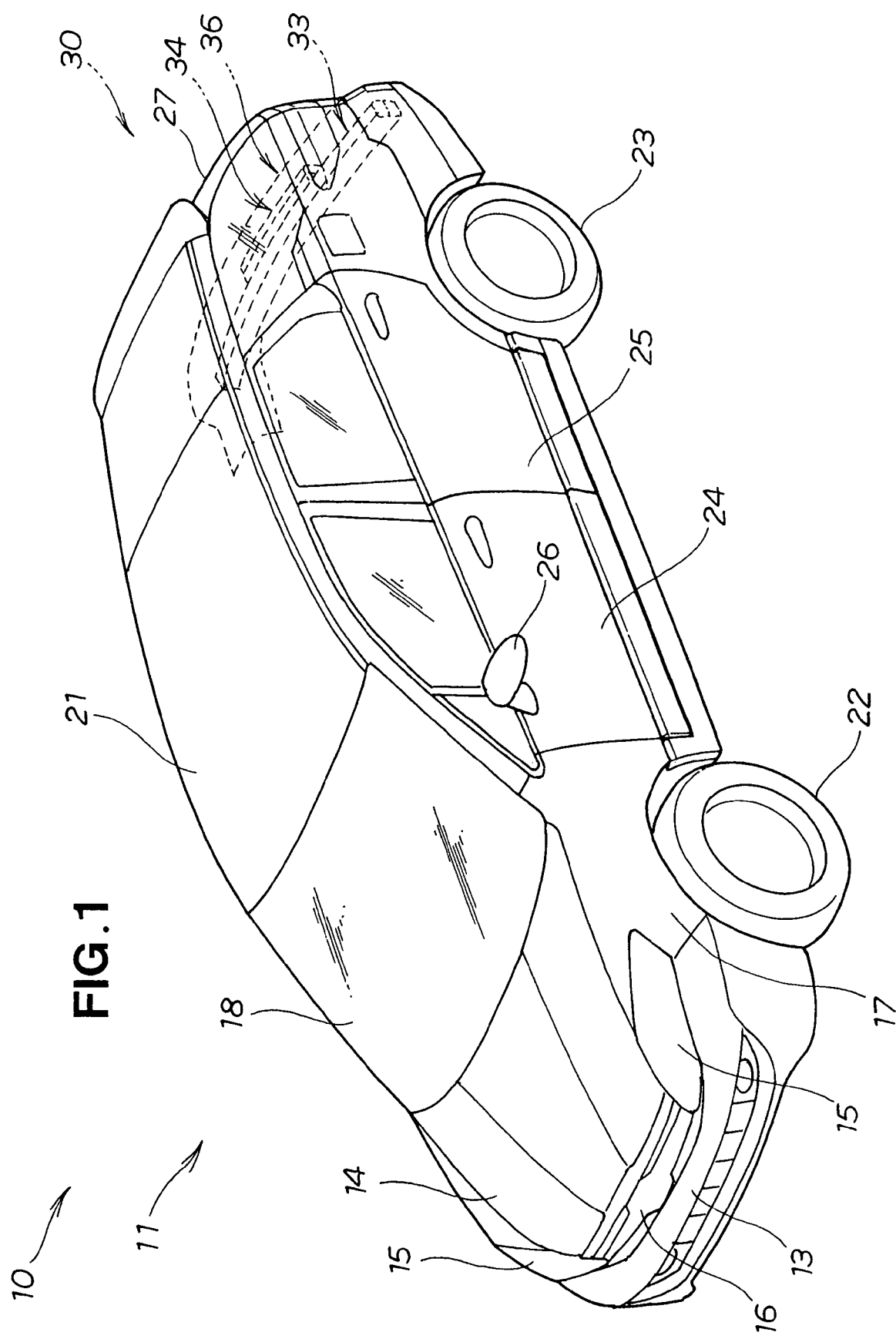
FIG. 1 is a perspective view of a vehicle employing a vehicle bumper structure in accordance with an embodiment of the present invention.

FIG. 1 is a perspective view of a vehicle employing a vehicle bumper structure 30 in accordance with an embodiment of the present invention. As shown, the vehicle 10 includes a vehicle body 11, front bumper 13, bonnet or hood 14, headlights 15, front grille 16, front fenders 17, front window 18, roof 21, front and rear road wheels 22 and 23, front and rear doors 24 and 25, door mirrors 26, tailgate 27, etc.

As will be later detailed, the vehicle bumper structure 30 of the invention is constructed to disperse an impact force (energy), applied to a gusset 34, to the almost entire bumper beam 33 having a slanted wall portion 62 on its outer portion.

Figure 2:
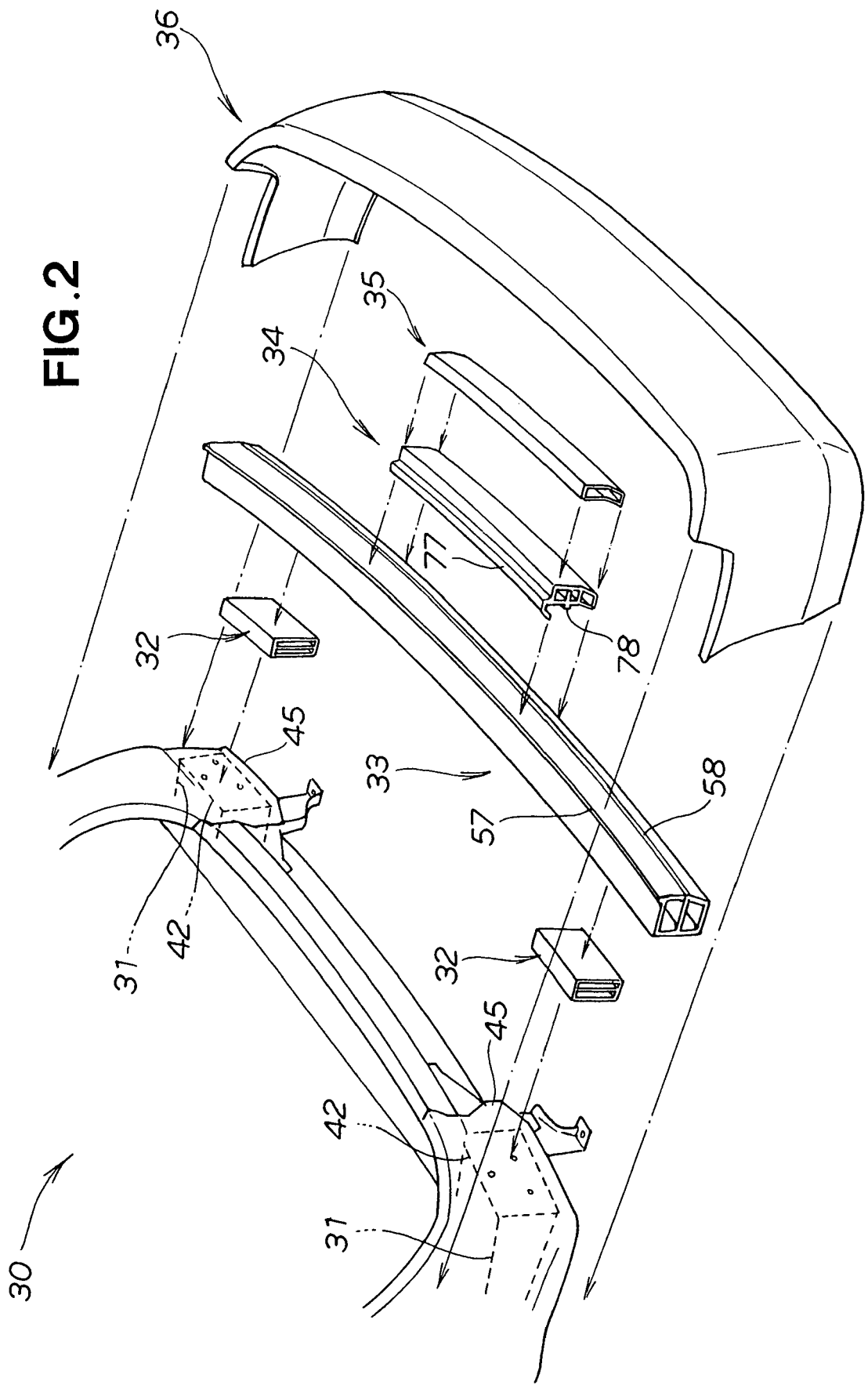
FIG. 2 is an exploded perspective view of the vehicle bumper structure of the present invention.

FIG. 2 is an exploded perspective view of the vehicle bumper structure 30 of the invention. The vehicle bumper structure 30 includes: left and right bumper mounting members (extensions) 32 to be mounted on left and right rear frames 31; a bumper beam 33 attached to the bumper mounting members 32; a gusset (i.e., impact-absorbing member) 34 attached to the bumper beam 33; a load transmitting member 35 attached to the gusset 34; and a bumper face 36 provided adjacent to (i.e., immediately outwardly of) the outer surface of the load transmitting member 35.

Figure 3:
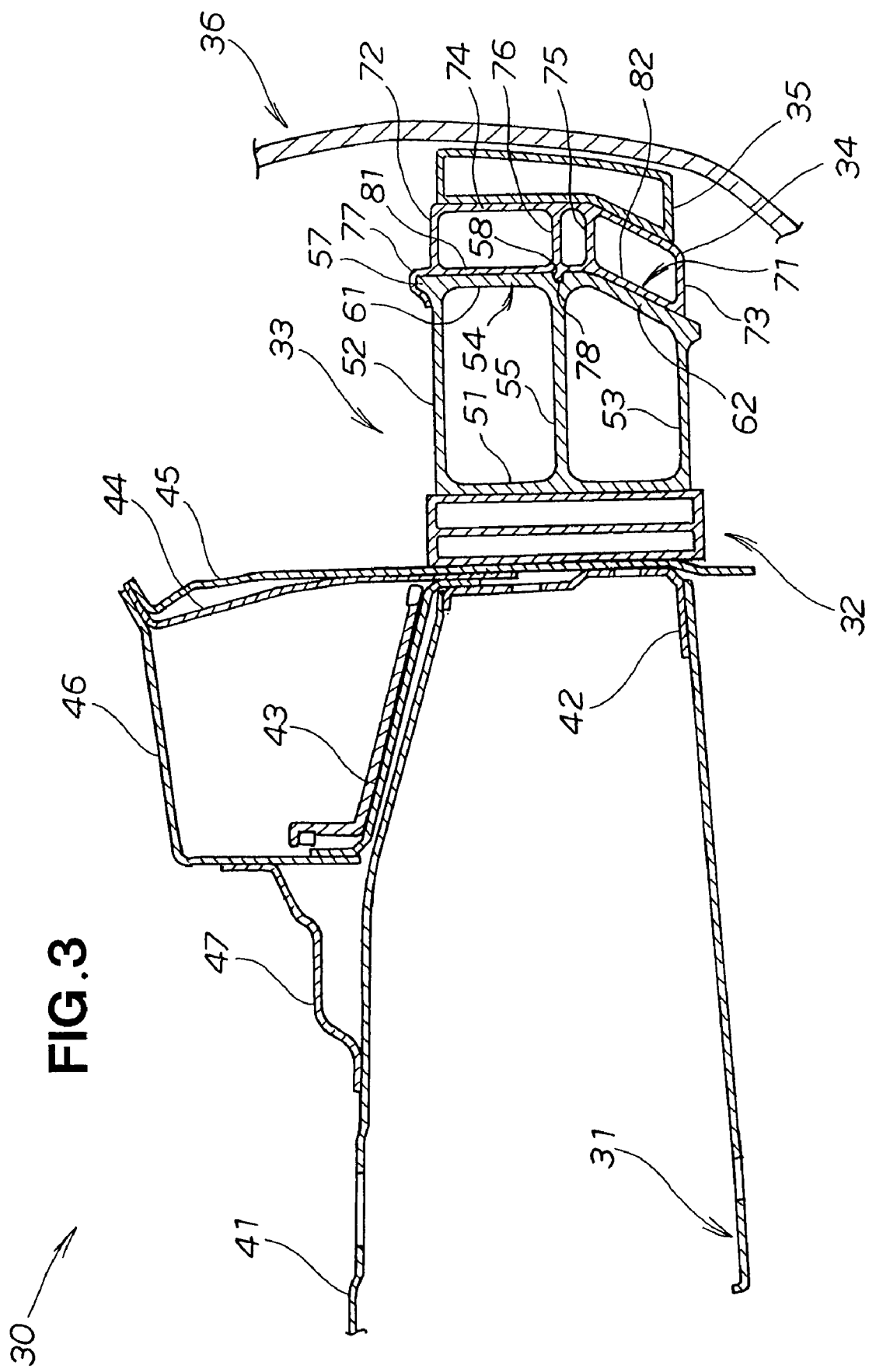
FIG. 3 is a sectional side view of the vehicle bumper structure of the present invention.

FIG. 3 is a sectional side view of the vehicle bumper structure 30 of the invention. As shown, each of the rear frames 31 has a substantial U sectional shape, and, for each of the rear frames 31, the structure includes: a rear frame cap 41 covering the upper surface the rear frame 31; a bumper beam bracket 42 covering the rear end of the rear frame 31 to thereby support the corresponding bumper mounting member (extension) 32; a rear-side extension 43 mounted outwardly of the bumper beam bracket 42; a garter 44 and rear pillar stiffener 45 mounted outwardly of the rear-side extension 43; a rear-panel-side extension 46 connecting the distal ends of the garter 44 and rear pillar stiffener 45 and the distal end of the rear-side extension 43; and a rear panel gusset 47 extending between the rear-panel-side extension 46 and the rear frame cap 41.

The bumper mounting member (extension) 32, via which the bumper beam 33 is to be mounted on the vehicle body, is formed to be deformable in response to an impact transmitted from the bumper beam 33 to thereby absorb an impact transmitting to the rear beam 31.

The bumper beam 33, which is a beam of a closed cross-sectional shape, has on each of its left and right end sections: a vehicle-body-side inner wall portion (vehicle-body-side rib) 51 to be mounted on the vehicle body 11 (rear frame 31); upper and lower outwardly-extending wall portions (upper and lower ribs) 52 and 53 extending from the upper and lower ends, respectively, of the vehicle-body-side inner wall portion 51 toward the outside of the vehicle body; an outer wall portion (outer rib) 54 connecting the upper and lower outwardly-extending wall portions 52 and 53; a horizontal inner rib 55 connecting the outer wall portion 54 and the inner wall portion 51; an upward projection 57 formed on an outer end portion of the upper outwardly-extending wall portion 52; and a concave portion 58 formed in the outer wall portion 54 to be fitted over a portion of the gusset (i.e., impact-absorbing member) 34.

The outer wall portion 54 has a vertical wall portion (vertical rib) 61 extending vertically downward from the outer upper end of the wall portion 54, and the above-mentioned slanted wall portion (slanted rib) 62 slanted from the lower end of the vertical wall portion 61 toward the vehicle body 11 (rear frame 31).

Further, the gusset 34 has: a bumper-abutting rib 71 shaped to extend along the outer wall portion 54 of the bumper beam 33; upper and lower extension ribs 72 and 73 extending outwardly from the upper and lower ends of the bumper-abutting rib 71; an outer rib 74 connecting the distal or outer ends of the upper and lower extension ribs 72 and 73; a horizontal rib 75 connecting the outer rib 74 and the bumper-abutting rib 71 and located adjacent to the slanted wall portion 62 of the bumper beam 33; and a reinforcing rib 76 connecting the outer rib 74 and the bumper-abutting rib 71 and located over the horizontal rib 75. The gusset 34 also has: an engagement portion 77 bulging upward from the upper end of the bumper-abutting rib 71 and engageable with the above-mentioned projection 57 of the bumper beam 33; a convex portion 78 formed on the bumper-abutting rib 71, bent toward the bumper beam 33 and fittable in the concave portion 58 of the bumper beam 33; a vertical rib 81 formed to extend along the vertical wall portion 61 of the bumper beam 33; and a slanted rib 82 formed to extend along the slanted wall portion 62 of the bumper beam 33.

Further, the load transmission member 35, which is a hollow member formed of polypropylene, is provided for filling a gap between the gusset (i.e., impact-absorbing member) 34 and the bumper face 36 to promptly transmit a load, applied to the bumper face 36, to the gusset 34 and bumper beam 33.

FIG. 4 is an enlarged sectional side view showing principal sections of the vehicle bumper structure 30 of the invention. The vehicle bumper structure 30 includes the bumper beam 33 of a closed sectional shape to be mounted on the vehicle body 11 and the gusset 34 to be attached to the outer surface 54 of the bumper beam 33 to absorb an impact force. The bumper beam 33 has the vehicle-body-side inner wall portion 51 to be mounted on the vehicle body 11; the upper and lower outwardly-extending wall portions 52 and 53 extending outwardly from the upper and lower ends of the vehicle-body-side inner wall portion 51; the outer wall portion 54 connecting the upper and lower outwardly-extending wall portions 52 and 53; and at least one horizontal inner rib 55 connecting the outer wall portion 54 and the inner wall portion 51. The outer wall portion 54 has the vertical wall portion 61 extending vertically downward from the upper end of the wall portion 54, and the slanted wall portion 62 slanted from the distal or lower end of the vertical wall portion 61 toward the vehicle body 11 (see FIG. 3), and the gusset 34 of a closed sectional shape includes the horizontal rib 75 for dispersing an impact force at least to the slanted wall portion 62.

Such arrangements can effectively reduce a force that pushes the bumper beam 33 upwardly, with the result that impact energy applied to the gusset 34 can be appropriately directed to and received by the slanted wall portion 62 of the bumper beam 33.

Further, the vehicle bumper structure 30 has the upward projection 57 formed on an upper outer end portion of the bumper beam 33, and the gusset 34 has the engagement portion 77 engageable with the above-mentioned projection 57. Thus, when adhering to the gusset 34 to the bumper beam 33, e.g. with the bumper beam 33 already mounted on the vehicle body, the gusset 34 can be readily retained on the bumper beam 33, through the engagement between the projection 57 and the engagement portion 77, until the adhesive agent is sufficiently cured, as a result of which the gusset 34 can be adhered to the bumper beam 33 with enhanced workability Further, the surface portion of the gusset 34 facing the bumper beam 33 is formed to correspond in shape to the outer wall portion 54 so as to extend along the outer wall portion 54, so that impact energy applied to the gusset 34 can be smoothly directed to bumper beam 33.

Further, in the vehicle bumper structure 30, the convex portion 78 is formed on the surface portion of the gusset 34 facing the bumper beam 33 and fittable in the concave portion 58 of the outer wall portion 54 of the bumper beam 33. Namely, the vehicle bumper structure 30 includes a concave-convex fitting structure on the surface of the outer wall portion 54 of the bumper beam 33 and the surface of the gusset 34 facing the bumper beam 33.

With such a concave-convex fitting structure, the vehicle bumper structure 30 can prevent the gusset 34 from accidentally falling off the bumper beam 33, e.g. during a transfer step, after the gusset 35 is provisionally attached to the bumper beam 33, as a result of which the gusset 35 can be attached to the bumper beam 33 with enhanced workability.

FIG. 5A is a view showing a conventional vehicle bumper structure 100, and FIG. 5B is a view showing the vehicle bumper structure 30 according to an illustrative embodiment of the present invention ("Embodiment"). The following paragraphs compare the conventional vehicle bumper structure 100 and the vehicle bumper structure 30 of the invention.

As shown in FIG. 5A, the conventional vehicle bumper structure 100 has: a vehicle-body-side inner wall portion 111 via which the bumper beam 103 is to be mounted on the vehicle body; upper and lower outwardly-extending wall portions 112 and 113 extending from the upper end lower ends of the vehicle-body-side inner wall portion 111 toward the outside of the vehicle body; an outer wall portion 114 connecting the upper and lower outwardly-extending wall portions 112 and 113; a horizontal inner rib 115 connecting the outer wall portion 114 and the inner wall portion 111.

The outer wall portion 114 has a vertical wall portion 121 extending vertically downward from the upper end of the wall portion 114, and a slanted wall portion 122 slanted from the lower end of the vertical wall portion 121 toward the vehicle body. Further, the gusset 104 has: a bumper-abutting rib 131 shaped to extend along the outer wall portion 114 of the bumper beam 103; upper and lower extension ribs 132 and 133 extending outwardly from the upper and lower ends of the bumper-abutting rib 131; an outer rib 134 connecting the distal or outer ends of the upper and lower extension ribs 132 and 133; a reinforcing rib 136 connecting the outer rib 134 and bumper-abutting rib 131 and located adjacent to the inner rib 115 of the bumper beam 103.

When a load is applied to the gusset 104 as indicated by white arrow a1 in FIG. 5A, the load is transmitted, via the upper extension rib 132 of the gusset 104, to the outwardly-extending wall portion 112 as indicated by arrow a2 and also transmitted, via the reinforcing rib 136 of the gusset 104, to the inner rib 115 as indicated by arrow a3. Therefore, almost no portion of the load is transmitted to the slanted wall portion 122 of the outer wall portion 114 of the bumper beam 103. As a consequence, the bumper beam 103 would be undesirably imparted with a force pushing the bumper beam 103 upwardly.

Figure 6:
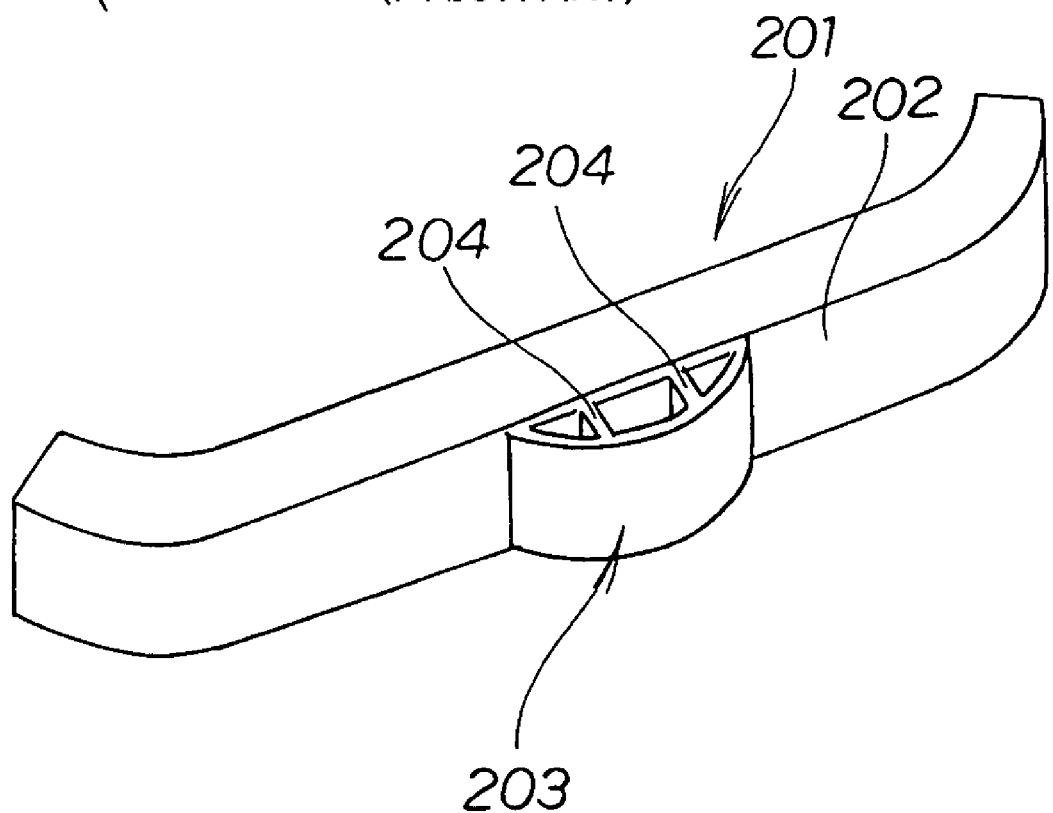
FIG. 6 is a perspective view explanatory of a fundamental construction of the conventional vehicle bumper structure.

By contrast, the vehicle bumper structure 30 according to the embodiment of the present invention includes the horizontal rib 75 for dispersing an impact force to the slanted wall portion 62, as shown in FIG. 6B. Thus, when a load is applied to the gusset 34 as indicated by white arrow b1 in FIG. 5B. the load not only can be transmitted, via the upper reinforcing rib 72 of the gusset 34, to the upper outwardly-extending wall portion 52 as indicated by arrow b2 and, via the reinforcing rib 76 of the gusset 34, to the inner rib 55 as indicated by arrow b3, but also can be transmitted, via the horizontal rib 75 of the gusset 34, to the slanted wall portion 62 as indicated by arrow b4. The load having been transmitted to the slanted wall portion 62 in the aforementioned manner can run downward along the portion 62 as indicated by arrow b5 and transmit to the lower outwardly-extending wall portion 53 as indicated by arrow b6. As a consequence, production of torque in the bumper beam 33 can be restrained, so that the load can be appropriately received by the outer wall portion 54 of the bumper beam 33.

Whereas the vehicle bumper structure 30 of the present invention has been described above in relation to the case where the concave portion 58 to be fittingly engaged with the gusset 34 is formed in the bumper beam 33 and the convex portion 78 to be fitted in the concave portion 58 of the bumper beam 33 is formed on the gusset 34, the present invention is not so limited, and the convex portion 78 may be formed in the bumper beam 33 with the concave portion 58 formed in the gusset 34.

As another modification, left and right positioning convex portions may be formed in the gusset 34 for positioning the gusset 34 in the left-right direction, and left and right positioning concave positions to be fittingly engaged with the convex portions may be formed in the bumper beam 33; in this way, the gusset 34 can be appropriately positioned in the left-right direction relative to the bumper beam 3 when the gusset 34 is to be attached to the bumper beam 33. As a result, an assembly operation of the gusset 34 can be performed with even further enhanced operability.

The above-described vehicle bumper structure of the present invention is suitably applicable to vehicles, such as sedans and wagons.

Obviously, various minor changes and modifications of the present invention are possible in light of the above teaching. It is therefore to be understood that within the scope of the appended claims the invention may be practiced otherwise than as specifically described.

What is claimed is:

1. A vehicle bumper structure comprising a bumper beam to be mounted on a vehicle body and a gusset to be attached to an outer surface of the bumper beam for absorbing an impact force, said bumper beam being a beam of a closed sectional shape which includes: a vehicle-body-side inner wall portion to be mounted on the vehicle body; upper and lower outwardly-extending wall portions that extend from upper and lower ends, respectively, of the vehicle-body-side inner wall portion toward an outside of the vehicle body; an outer wall portion connecting the upper and lower outwardly-extending wall portions; and at least one horizontal inner rib connecting the outer wall portion and the vehicle-body- side inner wall portion, said outer wall portion having a vertical wall portion extending vertically downward from an outer end of the upper outwardly- extending wall portion and a slanted wall portion slanted from a lower end of the vertical wall portion toward the vehicle body, said gusset having a closed sectional shape and including an upper horizontal inner rib aligned with said at least one horizontal inner rib of the bumper beam, and a lower horizontal inner rib disposed below the upper horizontal inner rib for dispersing an impact force at least to the slanted wall portion, wherein the lower horizontal inner rib is positioned at an oblique angle relative to the slanted wall portion of the bumper beam, said gusset further having an upper extension rib aligned with the upper outwardly-extending wall portion of the bumper beam.

2. The bumper structure of claim 1, wherein the lower horizontal inner rib contacts the slanted wall portion of the bumper beam, in order to help distribute force in the event of an impact.

3. A vehicle bumper structure according to claim 1, wherein said bumper beam has an upward projection formed at an upper portion thereof, and said gusset has an engagement portion engageable with the projection of said bumper beam.

4. A vehicle bumper structure according to claim 3, wherein a concave-convex fitting structure is provided on an outer wall portion of said bumper beam and a wall portion of said gusset facing said bumper beam.

5. A vehicle bumper structure comprising a bumper beam and a gusset, the bumper beam mounted on a vehicle body and the gusset attached to an outer surface of the bumper beam, the bumper structure provided on the vehicle to absorb an impact force, wherein:

the bumper beam comprising a vehicle side inner wall portion, upper and lower outwardly extending wall portions and an outer wall portion connecting the upper and lower wall portions to form a closed sectional shape;

a horizontal reinforcing rib connecting the outer wall portion and the inner wall portion;

the outer wall portion comprising a vertical wall portion extending vertically downward from an outer end of the upper wall portion and the outer wall portion having a slanted wall portion slanted from a lower end of the vertical wall portion extending toward the vehicle body;

an attachment between the bumper beam and the gusset;

the gusset comprising:

an inner rib comprising an inner vertical rib formed to extend along the vertical wall portion of the bumper beam and an inner slanted rib formed to extend along the slanted wall portion of the bumper beam;

an upper rib extending from the upper end of the inner vertical rib;

a lower rib extending from the lower end of the inner slanted rib;

an outer rib comprising an outer vertical rib and an outer slanted rib;

and a pair of spaced apart inner horizontal ribs intermediate the inner and outer rib ends connecting the inner rib and the outer rib;

the inner horizontal ribs situated adjacent the reinforcing rib of the bumper beam; and wherein the bumper structure is configured to promote stability thereof in the event of a rear impact.

6. The bumper structure according to claim 5, wherein a load transmission member attaches to the gusset and a bumper face extends the width of the vehicle covering the bumper structure.

7. The bumper structure according to claim 5, wherein the bumper structure is constructed to disperse an impact to the gusset to substantially the entire bumper beam.

8. The bumper structure according to claim 5, wherein the bumper structure is mounted to the vehicle by mounting extensions, the mounting extensions deform in response to an impact on the gusset.

9. The bumper structure according to claim 8, wherein left and right mounting extensions attached on the left and right rear frame of the vehicle, the bumper beam attached to the mounting extensions, the gusset attached to the bumper beam, a load transmitting member attached to the gusset and a bumper face attached adjacent to the outer surface of the load transmitting member.

10. The bumper structure according to claim 9, wherein the attachment between the bumper beam and the gusset comprises the gusset having an engagement portion extending upward from the upper end of the upper rib and engages an upward projection on the outer end of the upper wall portion of the bumper beam and a concave portion in the outer wall of the bumper beam that accepts a convex portion on the inner vertical rib of the gusset.

11. The bumper structure according to claim 10, wherein the attachment between the bumper beam and the gusset is formed by an adhesive in addition to the mechanical attachment formed by the concave-convex fitting portions.

* * * * *